Patented Sept. 15, 1936

2,054,108

UNITED STATES PATENT OFFICE 2,054,108

LAMINATED GLASS AND PROCESS
FOR MAKING SAME

James F. Walsh, Newton Center, Mass., assignor to Arthur D. Little, Inc., Cambridge, Mass., a corporation of Massachusetts No Drawing. Application October 14, 1932,
Serial No. 637,779

4 Claims. (Cl. 49—81)

In the manufacture of laminated glass, it is customary to build up a structure comprising two sheets of glass with a sheet or sheets of interposed transparent material such as pyroxylin plastic material or some other cellulosic derivative composition. Various means are used for promoting adhesion between the laminae; and heat and pressure complete the union. The product is suitable for use where sheets of a strong non-shattering transparent material are desired, for example as windows for automobiles, etc., where the glass may be subject to shocks or blows which, though destructive to ordinary glass, at most merely crack the laminated glass and do not scatter it.

This invention relates to a novel kind of laminated glass, and the process for producing it. I have found that purified zein may be used as the layer between the sheets of glass, giving a product which is strongly coherent, permanently transparent and colorless after prolonged exposure to operating conditions, and non-decomposing. The zein layers are more stable to light and heat than is nitrocellulose and retain flexibility longer.

In carrying out my invention, I may prepare a sheet or sheets of zein, and interpose same between sheets of clean glass upon which thin adhesive films of zein have been sprayed onto the glass surfaces facing the zein sandwich layer. Alternatively, I may form and build up the central zein layer by casting a zein-sheet upon each glass lamina; or by casting the zein-sheet upon one of the laminae only while the other receives the adhesive film. Whether formed by casting, or by placing a zein-sheet between zein-filmed surfaces, or by a combination of the two methods, the interposed zein when suitably treated as herein described, and under the influence of heat and pressure, unites the glass laminae into a unitary structure.

In preparing the zein sheet, I preferably mix together purified zein (96 to 100% pure, preferably); a plasticizer; and a mutual solvent. A suitable plasticizer is ortho- or para-toluene ethyl or methyl sulfonamide, or some other suitable aromatic alkylated sulfonamide, as disclosed in co-pending application Ser. No. 637,778, filed October 14, 1932 by present patentee and MacDonough, now Patent No. 1,966,604, issued July 17, 1934 and assigned to the assignee of this type of invention; this plasticizer, unlike phenol, or cresols and the like does not cause discoloration under the influence of sunlight and heat. Solvents include many of the low-molecular-weight alcohols with water, e. g. ethanol, iso-propanol, or tertiary butanol mixed with about one-fourth their volume of water; also relatively high boiling solvents such as aqueohs ethers of mono- and di-ethylene glycol (for example, ethylene glycol mono methyl or ethyl ether, ethylene glycol mono-butyl ether, di-ethylene glycol mono-ethyl or mono-butyl ether); aqueous diacetone alcohol; ethylene chlor-hydrine, and other solvents disclosed in the aforesaid Walsh and MacDonough application. Satisfactory methods of preparing the sufficiently pure zein are set forth in copending application, Ser. No. 35,102, filed August 7, 1935, by Harry A. Buron and John V. MacDonough, and assigned to the same assignee as the present invention, Patent No. 2,044,769, issued June 23, 1936.

The amount of plasticizer used may be about one part (by weight) to two and one-half parts of zein, or more or less according to the degree of plasticity desired. Enough solvent should be used to give a fluid which can be sheeted out in the usual way. Thus, the ingredients may include zein, 100 parts; and paratoluene ethyl sulfonamide, 40 parts; plus solvents as described. The materials are thoroughly mixed, and then filtered and cast as usual in the art of making such plastic sheets. A thickness of approximately 0.02 inch is suitable for the finished sheet.

The glass is prepared as usual, with thorough cleaning of its surfaces. It is then coated on one side with a thin adhesive film of zein, by spraying or otherwise applying thereto an adhesive solution of zein, consisting of zein in a suitable solvent such as aqueous ethanol, preferably but not necessarily plasticized, all for example as above described for the zein sheet. The adhesive film, being thus on one side of each sheet of glass, is allowed to dry. Then the zein sheet already prepared, and dry, is sprayed with a medium or high boiling solvent,—for example, a liquid which is a solvent for zein when hot, but not particularly so when cold. Such a solvent is ethylene chlorhydrine; or equal parts of chloroform and ethyl alcohol; or a mixture of about eight parts ethyl alcohol with one part each of water and a diethylene glycol ether.

These solvents are sprayed or otherwise applied to the zein sheets to soften and make tacky their surfaces. The zein sheets, while still tacky, are assembled with the glass, the zein-filmed surfaces of the latter toward the zein sheet, and the whole assembled under the influence of heat and pressure in a hydraulic press, or an autoclave. The usual care should be exercised during assembly to avoid air bubbles between the layers. The temperature should not be so high as to damage any of the constituents of the product, but should be above the softening point of the plasticizers used, sufficiently to cause the zein sheet and films to become firmly united with each other and thus bind the sheets of glass together in a strong unitary structure. The temperature and pressure and the time of the operation also depend upon various well-known factors such as thickness of glass, etc. The temperature should not be so high as to damage or decompose any of the constituents of the laminated product. A temperature of 245° F., or somewhat higher, is suitable, and should be applied for about 6 to 9 minutes for ordinary ⅛" plate glass. Time will depend upon temperature, thickness of glass, amount of padding between glass and press plates, and other well-known factors.

As already mentioned, it is possible to cast the zein sheet directly onto the glass to be laminated. Thus, the zein-plasticizer composition with sufficient solvent to flow satisfactorily, is cast directly on one or both sheets of cleaned glass. If cast on only one, the other sheet of glass has applied to it a thin film of zein, as hereinbefore described. But whether cast on one or both, the cast sheet (or sheets) of zein is sprayed with medium or high boiling solvent and firm union of the laminae is thereafter effected, all as hereinbefore described.

The laminated glass of this invention may be built up with several alternating sheets of glass and zein, with the glass preferably forming each of the two outside layers of the product. In such cases of multiple layers, the filming of the surfaces of glass next the zein sheets, or the casting, is carried out in accordance with this invention.

The heretofore referred to zein adhesive solution is an excellent adhesive and cementing composition for general use and consists of substantially pure zein dissolved in the previously referred to solvents such as an aqueous low molecular weight alcohol, or a high boiling solvent such as an ethylene glycol ether with water, an aqueous diacetone alcohol or an olefine halohydrin with or without a plasticizer. This adhesive may be prepared to have any suitable degree of fluidity and ordinarily is a rather thick solution such for example as that obtained by dissolving 20% by weight of high purity zein in an 80% ethanol —20% water (by volume) solvent. This adhesive is particularly stable to light and heat and is permanent and non-decomposing under ordinary conditions of use. The zein preferably should be between 95–100% pure.

On account of these properties, zein adhesive solution is very effective for cementing together the laminae of non-shatterable glass made up of glass plates united by an intermediate non-shatterable layer of any suitable transparent material such as pyroxylin plastic material or some other cellulosic ester composition or the zein composition of this invention or any other desired or preferred material. Whatever the nature of the intermediate layer, the zein adhesive solution is applied to the adjacent surfaces of the glass layers and a solvent is applied to the surfaces of the intermediate layer suitable to render them tacky whereupon the layers are heated and pressed together to form a unitary structure.

What I claim is:

1. Laminated glass comprising sheets of glass united by zein plasticized with an aromatic-alkylated-sulfonamide.

2. Laminated glass comprising sheets of glass united by zein plasticized with an aromatic-alkylated-sulfonamid, wherein the sulfonamid is alkylated with an alkyl having not more than two carbons.

3. Laminated glass comprising sheets of glass united by zein plasticized with an ortho-toluene alkylated sulfonamid wherein the sulfonamid is alkylated with an alkyl having not more than two carbons.

4. Laminated glass comprising sheets of glass united by zein plasticized with a para-toluene-alkylated-sulfonamid wherein the sulfonamid is alkylated with an alkyl having not more than two carbons.

JAMES F. WALSH.